United States Patent [19]

Prill et al.

[11] Patent Number: 4,633,853
[45] Date of Patent: Jan. 6, 1987

[54] HOT WATER TANK CHECK VALVE

[76] Inventors: Leonard Prill, 28522 Hillview; Michael F. Mathews, 20421 Lakeworth, both of Roseville, Mich. 48066

[21] Appl. No.: 730,815

[22] Filed: May 6, 1985

[51] Int. Cl.⁴ .................. F24H 1/00; F16K 15/06
[52] U.S. Cl. ................. 126/362; 137/515.7; 137/541; 137/542
[58] Field of Search ......... 137/541, 515.7, 542, 137/543, 533.31, 533.29; 126/362

[56] References Cited

U.S. PATENT DOCUMENTS

| | | | |
|---|---|---|---|
| 718,771 | 1/1903 | Kerfott | 137/533.31 |
| 2,608,210 | 8/1952 | St. Clair | 137/543 X |
| 3,351,081 | 11/1967 | Bogossian et al. | 137/541 X |
| 3,590,851 | 7/1971 | Bogossian et al. | 137/541 X |
| 3,727,636 | 4/1973 | Simmons | 137/542 X |
| 4,286,573 | 9/1981 | Nickel | 137/512 X |
| 4,535,807 | 8/1985 | Ericson | 137/533.29 X |

Primary Examiner—Martin P. Schwadron
Assistant Examiner—Stephen M. Hepperle
Attorney, Agent, or Firm—Krass & Young

[57] ABSTRACT

A valve mechanism especially suited for use in the inlet and outlet conduits of a hot water heater system comprises a pair of cup shaped metallic members positioned within the respective conduit in telescopic relationship to each other with a coil spring concentrically disposed between the outer cylindrical surface of the inner cup shaped member and the inner cylindrical surface of the outer cup shaped member. An annular flange formed integrally with the inner cup shaped member is clamped between two casing members forming the valve body at the intersection of the two casing members and a screw bolt extends longitudinally and centrally within the valving cavity with the screw bolt clampingly secured at its upstream end to the end wall of the outer cup shaped member and carrying a washer at its downstream end which coacts with the end wall of the inner cup shaped member to open and close the valve.

10 Claims, 8 Drawing Figures

HOT WATER TANK CHECK VALVE

This invention relates to hot water heating systems and particularly to a hot water heating system in which the heat loses in the system are minimized.

BACKGROUND OF THE INVENTION

Water heating systems are in common use in most domestic dwellings and generally comprise a hot water tank, a water inlet conduit for delivering cold water to the tank from a city water system or a well, and a water outlet conduit for delivering heated water from the tank to a demand location such as a faucet located within the dwelling. Means are provided to automatically heat the water in the tank in response to the entry of cold water into the tank upon removal of hot water from the tank to satisfy a demand from a faucet or the like. Whereas these prior art hot water systems have been generally satisfactory, they do allow substantial heat loss in the system by allowing migration of heated water from the tank upstream into the water inlet conduit and downsteam into the water outlet conduit. Various systems have been proposed in an attempt to curtail or eliminate migration of the tank hot water into the cold water inlet and hot water outlet conduits but these systems have either been unduly complicated, resulting in a high initial installation cost and high maintenance costs, or, if relatively simple and inexpensive, have been unsatisfactory in performance and/or have not provided the versatility needed to satisfy the varying demands of different types of hot water tank installations.

SUMMARY OF THE INVENTION

This invention is directed to a hot water heater assembly in which heat loss within the system is minimized.

More specifically, this invention is directed to a hot water heater assembly in which simple, inexpensive, versatile, and trouble free valve mechanisms are employed in the inlet and outlet to the hot water heater tank to preclude migration of hot water from the tank into the water inlet conduit and the water outlet conduit.

The valve mechanism of the invention, which may be conveniently utilized in the cold water inlet and/or the hot water outlet of the hot water system, comprises a valve body defining an elongated valving cavity having an upstream inlet and a downstream outlet; means defining a transverse partition closing the cavity except for a central aperture in the partition; a valve stem positioned longitudinally and centrally within the cavity and passing loosely adjacent its downstream outlet end through the central aperture in the partition; head means at the downstream outlet end of the valve stem for closing the aperture; a cylindrical cup shaped member positioned within the cavity upstream of the partition with its cylindrical side walls slidably engaging the adjacent interior walls of the cavity and its end wall positioned upstream of its side walls; means fixedly securing the upstream end of the valve stem to the central portion of the cup shaped member end wall; a coil spring positioned concentrically within the cylindrical side wall in surrounding relation to the valve stem with the upstream end of the spring bearing against the end wall and the downstream end of the spring bearing against the partition; and aperture means in the end wall radially outwardly of the central portion thereof. With this arrangement, with equal fluid pressures upstream and downstream of the valve assembly, the spring acts against and through the cup shaped member to urge the head means into closing relation to the aperture in the partition to preclude fluid migration between the areas upstream and downstream of the valve assembly and, in reponse to a drop in pressure downstream of the valve assembly occurring for example in response to opening of a faucet, the heat means on the valve stem is moved downstream away from the aperture against the resistance of the spring to allow fluid to flow through the aperture means in the end wall of the cup shaped member and thence downstream through the aperture in the partition to provide fluid flow through the valve assembly from upstream to downstream.

According to a further feature of the invention, the valve stem comprises a bolt; the head means on the valve stem comprises a washer positioned adjacent the head of the bolt; and the means for securing the upstream end of the valve stem to the central portion of the cup shaped member end wall comprises a shoulder on the bolt adjacent the upstream end of the bolt, thread means on the bolt upstream of the shoulder and passing through a central aperture in the end wall, and a nut threadably engaging the thread means on the bolt and clamping the end wall against the shoulder. This arrangement provides a simple, inexpensive and effective means for assembling the critical components of the valve assembly.

According to a further feature of the invention, the valve body is defined by an upstream tubular member and a downstream tubular member; and the means defining the transverse partition comprises a cup shaped member having a downstream end wall defining the partition, a cylindrical side wall of a diameter slightly smaller than the diameter of the spring and having the downstream end of the spring received there over, and an external flange clamped between adjacent annular surfaces on the upstream and downstream tubular members. This arrangement provides a convenient and ready method of mounting the valve assembly within the inlet or outlet conduit of the hot water tank and further provides a convenient means for housing, and controlling the movement of, the spring.

According to a further feature of the invention, the downstream tubular member is telescopically received within the upstream tubular member; the upstream member includes an annular internal rib; and the external flange on the downstream cup shaped member is clamped between the annular end edge of the downstream tubular member and the downstream annular surface of the rib.

According a further feature of the invention, the downsteam annular end edge of the cylindrical side wall of the upstream cup shaped member coacts with the upstream annular surface of the rib to define the fully open position of the valve assembly. This arrangement provides a convenient means of simplifying the installation of the valve assembly while at the same time precisely and readily defining the fully open position of the valve assembly.

DETAILED DESCRIPTION OF THE PREFERRED EMBODIMENT

Figure 1:
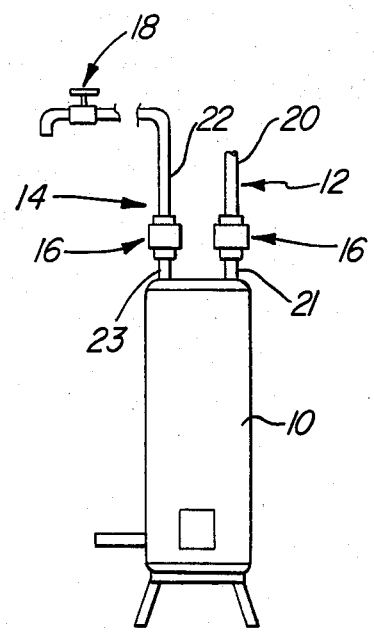
FIG. 1 is a somewhat schematic view of a hot water heater assembly according to the invention.

The hot water heater assembly according to the invention is seen schematically in FIG. 1 and, broadly considered, includes a hot water heater tank 10,; a cold water inlet conduit 12; a hot water outlet conduit 14; a first valve 16 in inlet conduit 12 and a second valve 16 in outlet conduit 14.

In use, hot water is withdrawn from the hot water tank 10 by turning on of a demand source such as the faucet seen at 18 and cold water enters the tank 10 through inlet conduit 12 to replenish the supply of water in the tank. Heating means function in known manner to constantly monitor the temperature of the water in the tank and add heat to the system when the temperature falls below a predetermined value.

The valve assemblies 16 in the cold water inlet conduit and the hot water outlet conduit are identical. The valve assembly 16 in the cold water inlet conduit 12 is interconnected between a pipe 20 connected with the source of cold water (city or well) and a pipe 21 communicating with the upper interior of tank 10. The valve assembly 16 in the hot water conduit 14 is interconnected between a pipe 22 communicating with the various hot water demand locations in the dwelling and pipe 23 communicating with the upper hot water heater 10.

Each valve assembly 16 includes a first tubular casing member 24; a second tubular casing member 26; a partition member 28; an actuator member 30; a stem assembly 32; and a valve spring 34.

Figure 2:
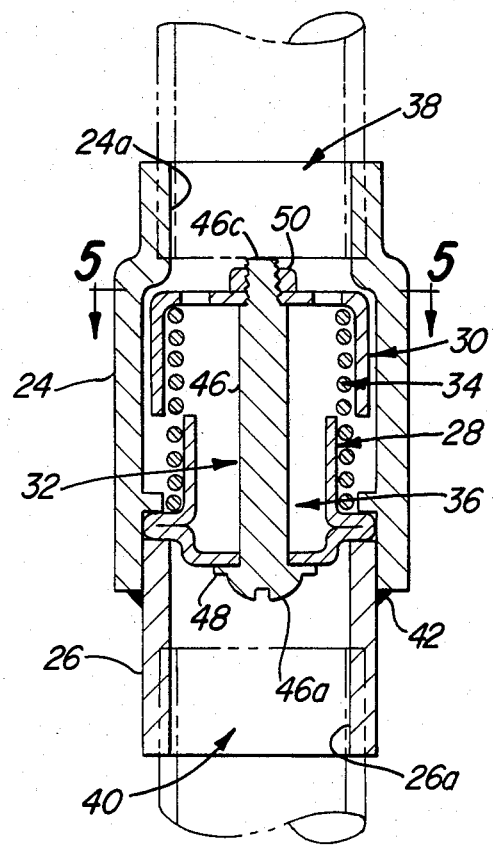
FIG. 2 is a cross sectional view showing the valve mechanism of the invention in its fully closed position.
Figure 3:
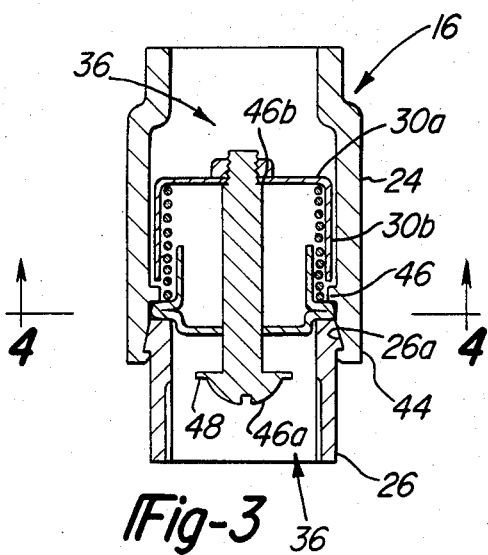
FIG. 3 is a cross sectional view showing the invention valve mechanism in its fully open position.
Figure 4:
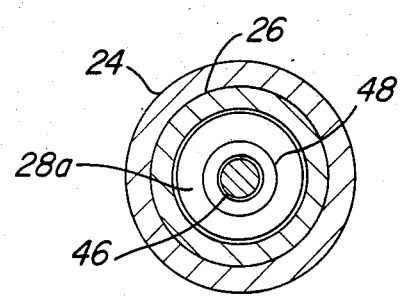
FIGS. 4 is a cross sectional view taken on lines 4—4 of FIG. 3.
Figure 5:
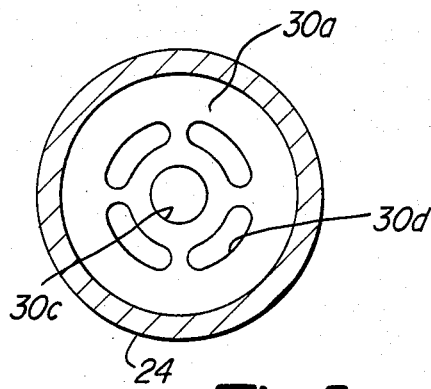
FIG. 5 is a cross sectional view taken on line 5—5 of FIG. 2.
Figure 6:
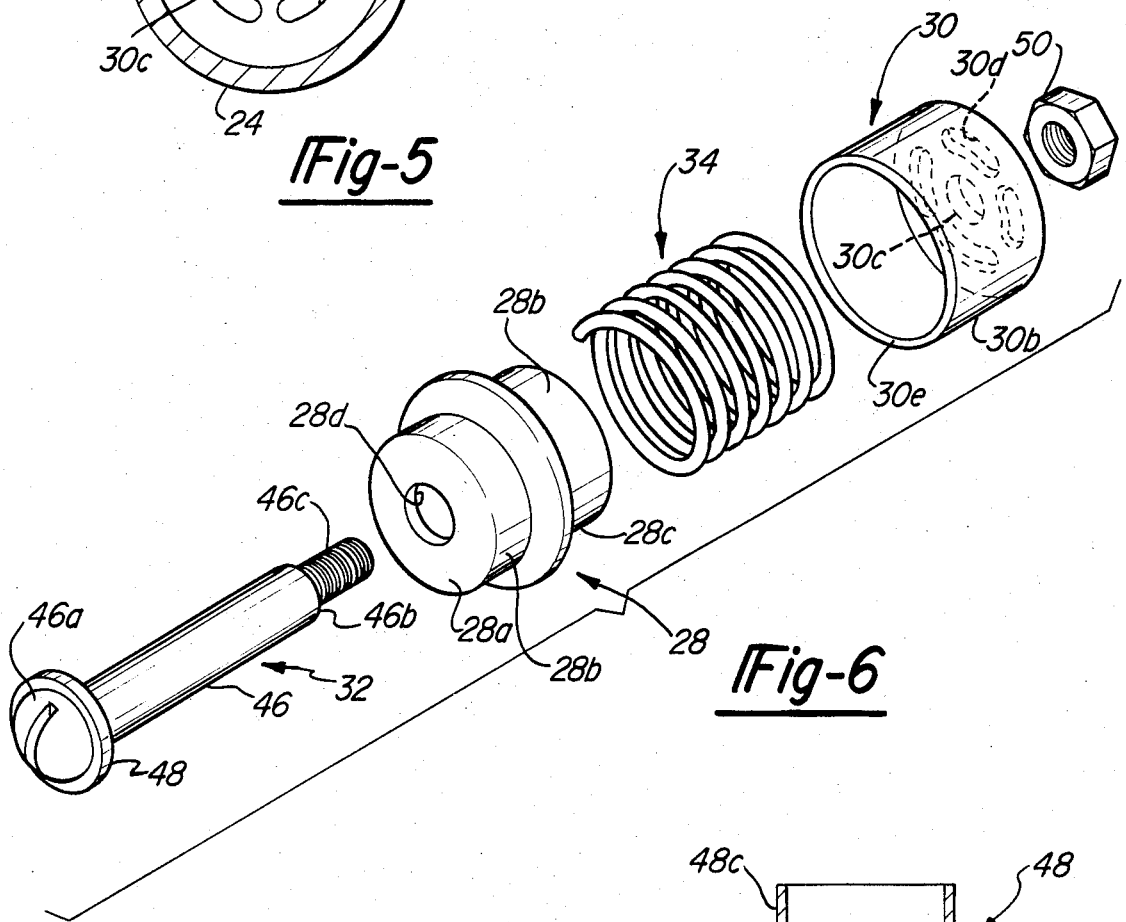
FIG. 6 is an exploded perspective view showing the various elements of the invention valve mechanism.
Figure 7:
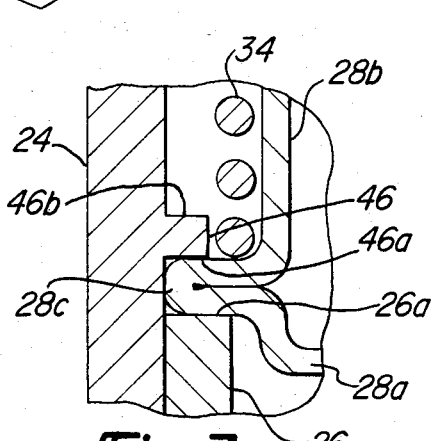
FIG. 7 is a detail view taken within the circle 7 of FIG. 2.

Casings 24 and 26 are fitted together telescopically to form a valve body defining a elongated valving cavity 36 having an upstream inlet 38 and a downstream outlet 40. Casings 24 and 26 may be formed of a metal such as brass or steel, in which event they are welded at 42, as seen in FIG. 2, to form a rigid unitary structure or, alternatively, as seen in FIG. 3, may be formed of a suitable PCV or CPCV plastic material in which event they are snappingly and telescopically fitted together as seen at 44. In either the metal or plastic embodiment, casing member 24 is provided with an internal circumferential rib 46 positioned, in the assembled relation of members 24 and 26, slightly upstream of the annular end edge 26a of casing member 26. Also in either embodiment, the casing member 24 includes a internally threaded portion 24a for threaded receipt of pipe 20 of inlet conduit 20 or pipe 22 of outlet conduit 14, and casing member 26 includes an internally threaded portion 26a for threaded receipt of pipe 21 of inlet conduit 12 or pipe 23 of outlet conduit 14.

Partition member 28 is formed of a suitable steel, coated with black paint for rustproofing purposes. Partition member 28 is generally cup shaped and includes an end wall 28a; a cylindrical side wall 28b; and an external circumferential flange portion 28c formed as an external fold or crimp in side wall 28b. A central aperture 28d is provided in end wall 28a. Actuator member 30 is formed of a suitable steel material coated with black paint for rustproofing purposes. Actuator member 30 is cup shaped and includes an end wall 30a and a cylindrical side wall 30b. End wall includes a central aperture 30c and a series of arcuate apertures 30d extending circumferentially and concentrically around central aperture 30c.

Spring 34 is formed of spring steel or music wire and may be suitably coated. Spring 34 has an external diameter slightly less than the internal diameter of cylindrical side wall portion 30b of actuator member 30 and an internal diameter slightly greater than the external diameter of cylindrical side wall portion 28b of partition member 28.

Stem assembly 32 comprises a screw bolt 46; a washer 48; and a nut 50. Bolt 46 may be formed of a coated steel; washer 48 may be formed of a suitable rubber material; and nut 50 may be formed of a suitable coated steel. Bolt 46 includes a slotted head 46a; a shoulder 46b and a threaded portion 46c extending from shoulder 46b to the free end of the bolt.

In assembly, with either the metal construction of FIG. 2 or the plastic construction of FIG. 3, partition member 28 is mounted within valving cavity 36 generally at the juncture of casing members 24 and 26 with flange portion 28c clamped between upstream annular edge 26a of casing member 26 and the confronting downstream annular surface 46a of internal rib 46. In this clamped configuration, end wall 28a of partition member 28 provides a partition separating the upstream and downstream portions of the valving cavity 36 with central aperture 28d providing fluid access between the two cavity portions. Spring member 34 is fitted concentrically over cylindrical side wall portion 28d of partition member 28 with the downstream end of the spring seated on the upstream annular surface of flange portion 28c, and the side wall portion 30b of actuator member 30 is fitted over the upstream end of spring 34 with the outer cylindrical surface of side wall portion 30d slidably coacting with the adjacent internal cylindrical surface of casing member 24. End wall 30a of actuator member 30 is clamped between bolt shoulder 46b and nut 50 and screw bolt 32 extends longitudinally and centrally within valving cavity 36 with the downstream end of the bolt passing loosely through aperture 28d.

In the closed position of the valve, as seen in FIG. 2, spring member 34 acts against end wall 30a of actuator member 30 to maintain washer 48 in sealing engagement with end wall 28a of partition member 28 and close aperture 28d so that the upstream and downstream portions of valving cavity 36 are isolated from each other. In the open position of the valve, as seen in FIG. 3, actuator member 30 has moved downstream against the resistance of spring 34 to space washer 48 from aperture 28d and provide access through aperture 28d between the upstream and downstream portions of the valving cavity. The extreme open position of the valve is defined by engagement of the downstream annular edge 30e of actuator member side wall portion 30b with the upstream annular edge surface 46b of internal rib 46.

In the use of the invention valve assembly in the hot water heater system of FIG. 1, the valve assembly 16 in inlet conduit 12 is positioned with bolt 46 extending downwardly, as seen in FIGS. 2 and 3, and the valving mechanism 16 in the outlet conduit 14 is positioned with bolt 46 extending upwardly and the other parts of the mechanism correspondingly reversed with respect to the position shown in FIGS. 2 and 3.

In operation of the invention valving mechanism in the hot water heater system of FIG. 1, the valving mechanism in both the inlet and outlet conduits of the water heater are normally in their closed positions as seen in FIG. 2 so that there is no communication between the upstream and downstream portions of the valving cavity in each case. This precludes migration of heated water upwardly in the inlet conduit 12 from the tank 10 and precludes migration of heated water upwardly in the outlet conduit 14, thereby minimizing heat losses in the hot water system. When a hot water demand is made on the system, as for example by turning on the faucet 18, the valving mechanism 16 in outlet conduit 14 is moved to its open position as seen in FIG. 3 by virtue of the differential pressure acting across the valve and a flow of hot water is created through apertures 30d and through aperture 28d to provide a flow of hot water from the hot water tank to faucet 18. As hot water is withdrawn from the tank, the pressure on the downstream side of the valve 16 in the inlet conduit 12 drops so that actuator member 30 of that valve mechanism is moved downwardly against the force of spring 34 to position the valve in the open position of FIG. 3 in which cold water may flow from the cold water source to the tank through apertures 30d and aperture 28d. As soon as the demand for hot water is terminated, as for example by closing of the faucet 18, the valve mechanism 16 in both the outlet conduit and inlet conduit close automatically to thereby preclude any heat loss by water migration upwardly through the inlet conduit or the outlet conduit.

The invention valve mechanism and hot water heater assembly will be seen to provide a simple and effective arrangement for precluding heat losses in a hot water system. Specifically, the invention valve mechanism is extremely simple and inexpensive in construction and extremely simple to install. The invention valve mechanism is also readily tailored to varying hot water heater specifications simply by varying the spring rate of spring 34.

Figure 8:
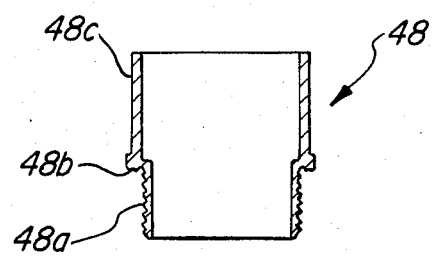
FIG. 8 is a detail view of an insert for use with the invention valve mechanism.

Whereas a preferrred embodiment of the invention has been illustrated and described in detail, it will be obvious that various changes may be made in the disclosed embodiment without departing from the scope or spirit of the invention. For example, in certain installations the invention valve mechanism may further include a pair of inserts of the type seen at 48 in FIG. 8. Specifically, in installations involving copper pipes, inserts 48 are formed of brass and are interfitted between pipe 20 or 23 and casing member 24 and between pipe 21 or 22 and casing member 26. In each case, the threaded portion 48a of the insert is threaded into the respective casing member until shoulder 48b engages the annular edge of the casing member whereafter the respective copper pipes are positioned telescopically within the insert portions 48c and welded to the inserts. Alternatively, in situations involving plastic pipes, the inserts may be formed of a suitable PCV or CPCV plastic material with portions 48a threaded into the respective casing members and the plastic pipes secured by gluing in the portions 48c of the respective inserts.

What is claimed is:

1. A fluid check valve assembly comprising:
   A. a valve body defining an elongated valving cavity having an upstream inlet and a downstream outlet;
   B. a first cylindrical cup shaped member positioned within said cavity and including a downstream end wall having a central aperture and a cylindrical side wal upstream of said end wall having an outer cylindrical surface spaced from the confronting inner surface of said cavity;
   C. a valve stem positioned longitudinally and centrally within said cavity and passing loosely through said aperture;
   D. head means at the downstream end of said valve stem for closing said aperture;
   E. a second cylindrical cup shaped member positioned within said cavity upstream of said first member with its cylindrical side wall slidingly engaging the confronting inner surface of said cavity, the inner cylindrical surface of its side wall spaced radially outwardly from the outer cylindrical surface of said side wall of said first cup shaped member to define an annular space therebetween and its end wall positioned upstream of its side wall;
   F. means fixedly securing the upstream end of said valve stem to the central portion of the end wall of said cup shaped member;
   G. a coil spring positioned in said annular space in surrounding relation to said valve stem with the upstream end of the spring bearing against said end wall of said second cylindrical member and the downstream end of the spring bearing against a fixed portion of said pippet valve and received telescopically over said side wall of said first cylindrical member; and
   H. aperture means in said end wall radially outwardly of said central portion thereof whereby, with equal fluid pressures upstream and downstream of said valve assembly, said spring acts against and through said cup shaped member to urge said head means into closing relation to said aperture in said partition to preclude fluid migration between the areas upstream and downstream of said valving assembly and, in response to a drop of pressure downstream of said valve assembly, said head means on said valve stem is moved downstream away from said aperture against the resistance of said spring to allow fluid to flow through said aperture means in said end wall of said cup shaped member and thence downstream through said aperture in said partition to provide fluid flow through the valve assembly from upstream to downstream.

2. A valve assembly according claim 1 wherein:
   I. said valve stem comprises a bolt;
   J. seaid head means comprises a washer positioned against the head of said bolt;
   K. said means for securing the upstream end of said valve stem to said central portion of said second cup shaped member wall of said cup shaped member comprises a shoulder on said bolt adjacent the upstream end of said bolt, thread means on said bolt upstream of said shoulder passing through a central aperture in said end wall, and a nut threadably engaging said thread means and clamping said second cup shaped member end wall against said shoulder.

3. A valve assembly according to claim 1 wherein:
   I. said valve body is defined by an upstream tubular member and a downstream tubular member;
   J. said first cup shaped member includes
      (1) a downstream end wall defining said partition, (2) a cylindrical side wall of a diameter slightly smaller than the diameter of said spring and having the downstream end of said spring received there over, and (3) an external circumferential flange clamped between adjacent annular surfaces on said upstream and downstream tubular members.

4. A valve according to claim 3 wherein:

K. said downstream tubular member is telescopically received within said upstream tubular member;

L. said upstream member includes an annular internal rib; and

M. said external flange is clamped between the upstream annular end edge of said downstream tubular member and the downstream annular surface of said rib.

5. A valve assembly according to claim 4 wherein:

N. the downstream annular end edge of the cylindrical side wall of said second cup shaped member coacts with the upstream annular surface of said rib to define the fully open position of said valve assembly.

6. A hot water heater assembly comprising:

(A) a hot water tank including heating means;

(B) a cold water conduit for delivering cold water to said tank;

(C) a hot water conduit for delivering heated water from said tank to a hot water demand location;

(D) a first spring loaded poppet valve positioned in said cold water conduit adjacent said tank and normally closed to preclude migration of hot water into said cold water conduit from said tank but operative in response to withdrawal of hot water from said tank to open and allow replenishing cold water to flow into said tank; and (E) a second spring loaded poppet valve substantially identical to said first poppet valve and positioned in said hot water conduit adjacent said tank normally closed to preclude migration of hot water into said hot water conduit but operative in response to demand for hot water at said demand location to open and allow hot water to flow from said tank to said demand location;

(F) each of said poppet valves comprising:

(1) a valve body defining an elongated valving cavity having an upstream inlet and downstream outlet, (2) a first cylindrical cup shaped member positioned within said cavity and including a downstream end wall having a central aperture and a cylindrical side wall upstream of said end wall having an outer cylindrical surface spaced from the confronting inner surface of said cavity, (3) a valve stem positioned centrally and longitudinally within said cavity and passing loosely through said aperture.

(4) head means at the downstream end of said valve stem for closing said aperture, (5) a second cylindrical cup shaped member positioned within said cavity upstream of said first member with the outer cylindrical surface of its cylindrical side wall slideably engaging the confronting inner surface of said cavity, the inner cylindrical surface of its side wall spaced radially outwardly from the outer cylindrical surface of said side wall of said first cup shaped member to define an annular space therebetween, and its end wall position upstream of its side wall;

(6) means fixedly securing the upstream end of said valve stem to the central portion of the end wall of said second cup shaped member, (7) a coil spring positioned in said annular space in surrounding relation to said valve stem with the upstream end of the spring bearing against said end wall of said second cylindrical member and received telescopically within said side wall of said second cylindrical member, and the downstream end of said spring bearing against a fixed portion of said poppet valve and received telescopically over said side wall of said first cylindrical member, and (8) aperture means in said end wall of said second cylindrical member radially outwardly of said central portion thereof.

7. A water heater assembly according to claim 6 wherein:

(G) said valve stem comprises a bolt;

(H) said head means comprises a washer positioned adjacent the head of said bolt; and (I) said means for securing the upstream end of said valve stem to said central portion of said second cup shaped member end wall comprises a shoulder on said bolt adjacent the upstream end of said bolt, thread means on said bolt upstream of said shoulder and passing through a central aperture in said second cup shaped member end wall, and a nut threadably engaging said thread means and clamping said second cup shaped member end wall against said shoulder.

8. A hot water heater assembly according to claim 6 wherein:

(G) said valve body is defined by an upstream tubular member and a downstream tubular member; and (H) said first cup shaped member includes an external flange clamped between adjacent annular surfaces on said upstream and downstream tubular members.

9. A hot water heater according to claim 8 wherein:

(I) said downstream tubular member is telescopically received within said upstream member;

(J) said upstream member includes an annular internal rib;

(K) said external flange is clamped between the upstream annular end edge of said downstream tubular member and the downstream annular surface of said rib.

10. A hot water heater according to claim 9 wherein:

(L) a downstream annular end edge of the cylindrical side wall of said second cup shaped member coacts with the upstream annular surface of said rib to define the fully open position of said valve assembly.

* * * * *